United States Patent [19]
Dudfield et al.

[11] Patent Number: 5,601,936
[45] Date of Patent: Feb. 11, 1997

[54] METHOD OF OPERATING A FUEL CELL

[75] Inventors: Christopher D. Dudfield, Loughborough; Andrew L. Dicks, Ashby De La Zouch, both of England

[73] Assignee: British Gas plc, London, England

[21] Appl. No.: 441,733

[22] Filed: May 16, 1995

[30] Foreign Application Priority Data

Jun. 16, 1994 [GB] United Kingdom .................. 9412073

[51] Int. Cl.$^6$ ........................................... H01M 8/04
[52] U.S. Cl. ............................... 429/13; 429/16; 429/17; 429/19
[58] Field of Search ............................ 429/13, 16, 17, 429/19

[56] References Cited

U.S. PATENT DOCUMENTS

| | | |
|---|---|---|
| 3,207,682 | 9/1965 | Elmsford et al. . |
| 3,300,345 | 1/1967 | Lyons, Jr. . |
| 3,436,271 | 4/1969 | Cole et al. . |
| 3,544,380 | 12/1970 | Dey . |
| 4,756,718 | 7/1988 | Ueno et al. . |
| 5,100,742 | 3/1992 | Wang et al. ........................ 429/13 |
| 5,132,193 | 7/1992 | Reddy et al. ...................... 429/13 |
| 5,462,815 | 10/1995 | Horiuchi ............................ 429/13 |

FOREIGN PATENT DOCUMENTS

| | | |
|---|---|---|
| 0334474 | 9/1989 | European Pat. Off. . |
| 0357077 | 3/1990 | European Pat. Off. . |
| 93188 | 2/1969 | France . |
| 61-165966 | 7/1986 | Japan . |
| 62-22572 | 9/1987 | Japan . |
| 2250130 | 5/1992 | United Kingdom . |

OTHER PUBLICATIONS

J. Electrochem. Soc., vol. 139, No. 9, Sep. 1992, pp. 2519–2525, Shing-Ru Wang, et al., "Pulsed–Potential Oxidation of Methanol".

Electrochemical Technology, vol. 4, No. 9–10, Sep.–Oct. 1966, pp. 460–464, M. L. Kronenberg, et al., "Effects of Heavy Discharge Pulsing on Fuel Cell Electrodes".

Product Engineering, vol. 37, No. 9, Apr. 25, 1966, p. 40, M. C. Deibert, "A New Way To Improve The Electrochemical Efficiency of Hydrocarbon Fuel Cells".

Chemical Abstracts, vol. 103, No. 12, Sep. 23, 1985, AN–90483, JP–60–062063, Apr. 10, 1985.

Chemical Abstracts, vol. 106, No. 14, Apr. 6, 1987, AN–105462, JP–61–243663, Oct. 29, 1986.

*Primary Examiner*—M. Nuzzolillo
*Attorney, Agent, or Firm*—Oblon, Spivak, McClelland, Maier & Neustadt, P.C.

[57] ABSTRACT

A fuel cell is operated at a temperature which is not greater than substantially 250° C., has an electrolyte which can be a solid polymer electrolyte, a liquid phosphoric acid electrolyte, or a liquid alkaline electrolyte, and a cathode and an anode each comprising a platinum catalyst. Hydrogen fuel gas is supplied to the anode and a gaseous oxidant, for example oxygen is supplied to the cathode. The cathode and anode are both connected to first and second circuits in parallel. The first circuit includes a load to be powered by the fuel cell and a first switch. The second circuit includes a battery and a second switch. The switches are operated by a control. When the first swtich is closed the cell powers the load and the second switch is open. When the first switch is open the second switch is closed so the battery applies a reverse D.C. potential the anode and cathode. The first switch is closed and the second switch is open for a time period T1 which is substantially at least ten times greater than time period T2 for which the first switch is open and the second switch is closed. The time period T2 does not exceed substantially 0.25 seconds. The switches can be relays or solid state electronic switch arrangements.

28 Claims, 3 Drawing Sheets

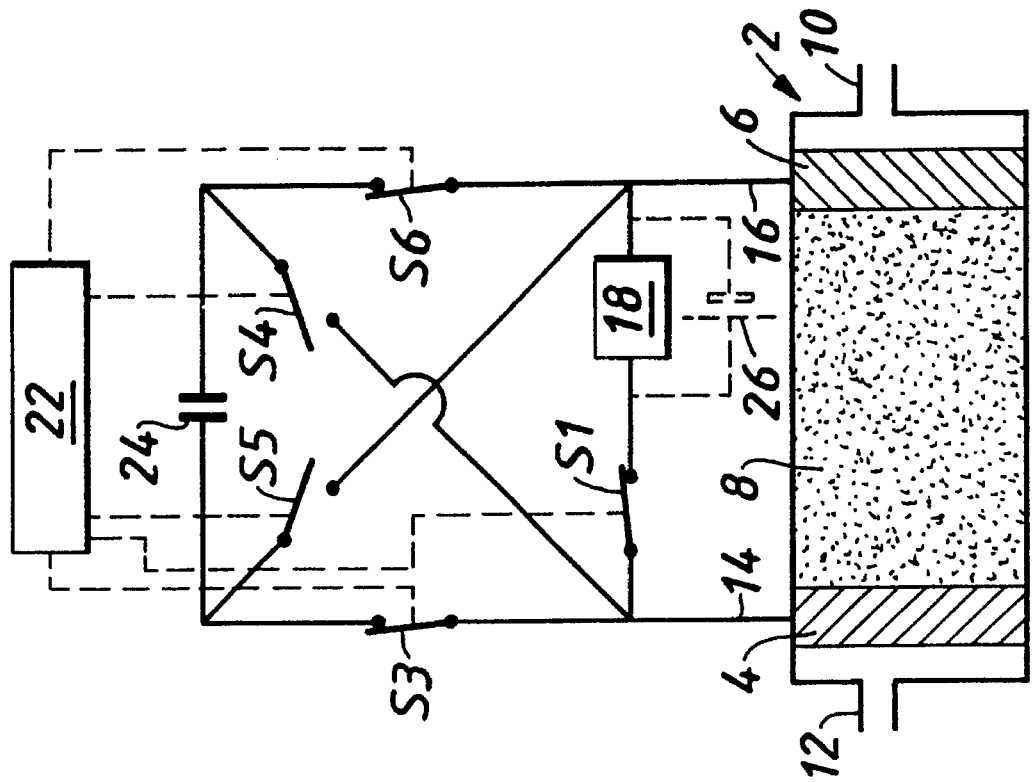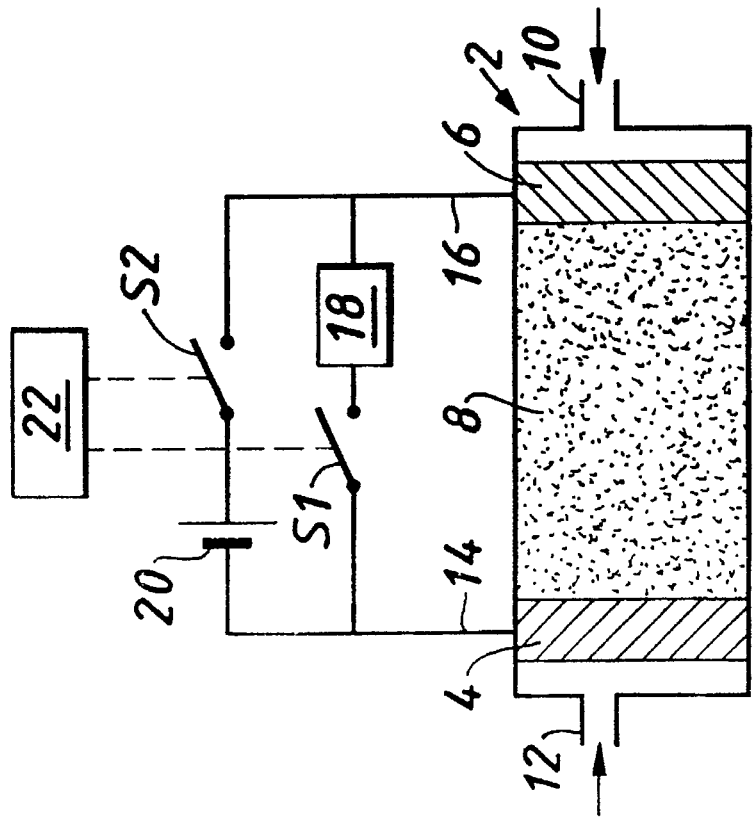

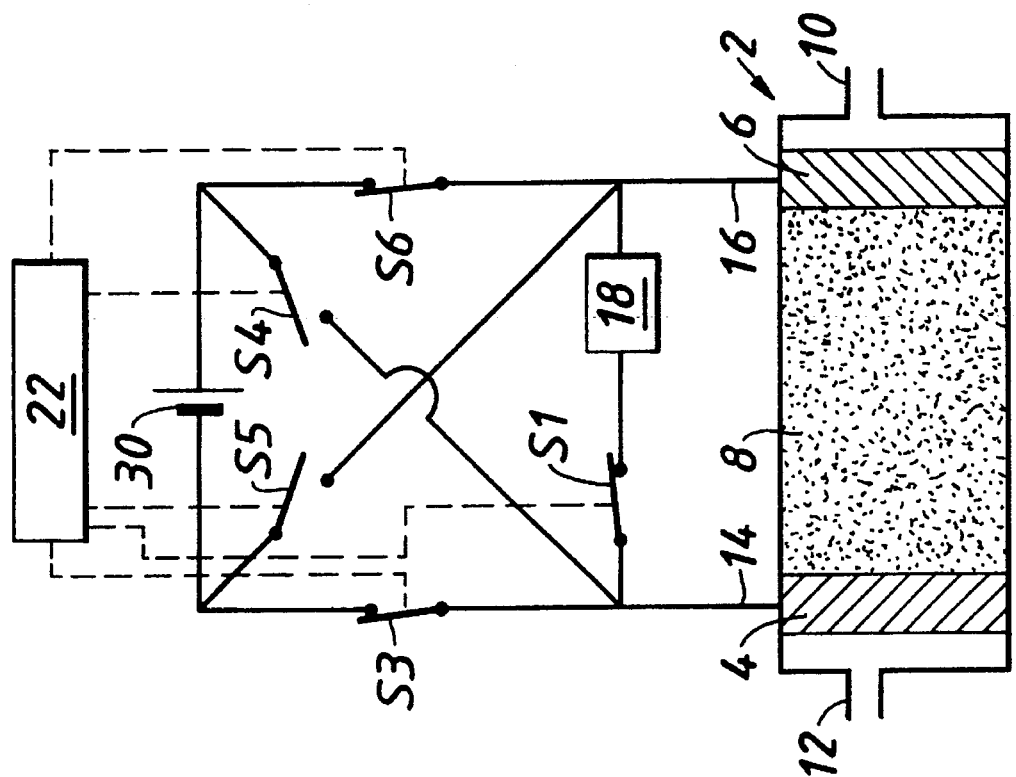
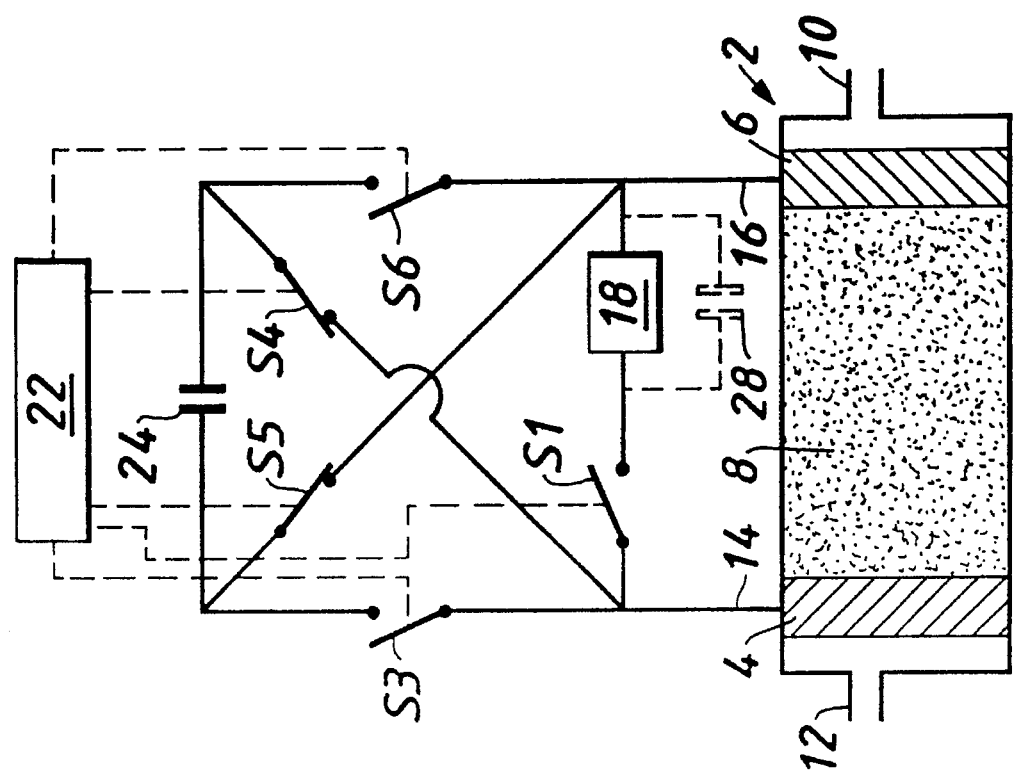

METHOD OF OPERATING A FUEL CELL

BACKGROUND TO THE INVENTION

This invention concerns a method of operating a fuel cell, and also concerns apparatus to perform the method when in combination with the fuel cell.

The fuel cell concerned is of the type (hereinafter called the type referred to) comprising an anode and a cathode each comprising catalyst means comprising platinum.

It is known to supply fuel cells of the type referred to with hydrogen gas fuel to the anode and oxygen gas oxidant to the cathode. The hydrogen should not contain substances Which will poison the catalyst means. It is known to supply hydrogen produced by reforming a hydrocarbon, for example methane or natural gas. However the resultant hydrogen may also contain carbon monoxide which is preferentially adsorbed onto the surface of the anode catalyst means comprising platinum and poisons the catalyst means at the anode resulting in the effective internal resistance of the cell increasing and the external current decreasing to a low or possibly zero level. Thus as the anode becomes increasingly poisoned, the cell performance deteriorates. To avoid poisoning of the catalyst means, it is known to use catalytic or other means to convert the carbon monoxide in the hydrogen fuel gas to carbon dioxide (or some other substance, for example methane, which does not poison the catalyst means) before the hydrogen is supplied to the cell.

The provision of such catalytic or other means to convert carbon monoxide to carbon dioxide (or said other substance which is non-poisonous to the catalyst means) externally of the fuel cell not only adds an extra process and increases costs, but it does not cure the problem of detoxifying the catalyst means of the anode, should any carbon monoxide be carried into the cell with the hydrogen.

An object of the invention is to provide a method of operating a fuel cell of the type referred to in which the catalyst means of the anode which may be subject to poisoning by carbon monoxide can be detoxified (or the cell rejuvenated) in a relatively simple and inexpensive manner.

SUMMARY OF THE INVENTION

According to a first aspect of the invention there is provided a method of operating a fuel cell of the type comprising an anode and a cathode each comprising catalyst means comprising platinum, the method comprising supplying gaseous fuel comprising hydrogen and/or a gaseous alcohol to said anode and supplying gaseous oxidant comprising oxygen to said cathode, operating the fuel cell at a temperature which does not exceed substantially 250° C., providing an interruptable first circuit externally of the cell for electric current derived from the cell to flow in the external circuit from the cathode to the anode by reason of the cathode being at a positive potential relative to the anode, providing a second circuit externally of the cell, said second circuit comprising electrical energy supply means for supplying selectively a reverse D.C. potential to said anode and cathode thereby putting the anode at a positive potential with respect to said cathode, interrupting and completing the first circuit alternately and operating the second circuit whereby when the first circuit is interrupted the reverse D.C. potential is applied simultaneously by means of the second circuit and when the first circuit is completed application of said reverse potential ceases, said first circuit being completed for a first time period and said reverse D.C. potential being applied for a second time period, said first time period being at least ten times greater than said second time period, and the second time period being not greater than substantially 0.25 seconds.

According to a second aspect of the invention there is provided apparatus to be used in combination with a fuel cell or with a stack or battery thereof so that when the apparatus is in use in said combination the or each fuel cell is operated according to the method defined according to said first aspect of the invention provided the or each said fuel cell is operated at said temperature condition and is supplied with said gaseous fuel.

Using certain know electrolytes in the fuel cell, the operating temperature need not exceed substantially 100° C. and possibly need not exceed substantially 80° C., an example of such an electrolyte is a solid polymer electrolyte. If the fuel cell is an alkaline fuel cell in which the electrolyte is a liquid alkaline electrolyte, the operating temperature is substantially 65° C. Using certain other known electrolytes, which may be liquid, the operating temperature need not exceed substantially 250° C. and possibly need not exceed substantially 200° C., an example of such an electrolyte is a phosphoric acid electrolyte.

BRIEF DESCRIPTION OF THE DRAWINGS

Each aspect of the invention will now be further described, by way of example, with reference to the accompanying drawings in which:

FIG. 1 diagramatically shows one embodiment of apparatus in combination with a fuel cell according to the second aspect of the invention for carrying out the method according to the first aspect;

FIG. 2 diagramatically shows another embodiment of apparatus in combination with a fuel cell according to the second aspect of the invention for carrying out the method according to the first aspect;

FIG. 3 diagramatically shows the combination in FIG. 2 operating to apply the reverse D.C. potential to the fuel cell;

FIG. 4 diagramatically shows a modification of the combination shown in FIG. 2, and FIG. 5 diagramatically shows a stack or battery of fuel cells to which the apparatus of FIG. 1, or of FIGS. 2 and 3, or of FIG. 4 can be connected so that each fuel cell in the stack or battery is operated according to the first aspect of the invention.

DESCRIPTION OF THE PREFERRED EMBODIMENTS

Figure 5:
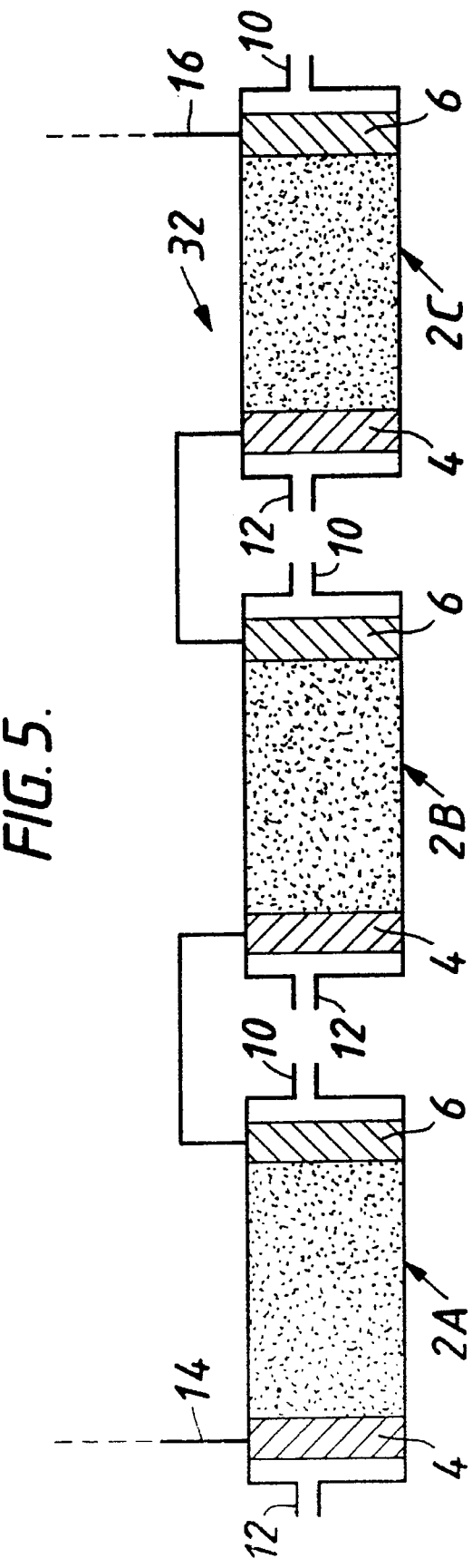

In the drawings the same or corresponding parts are identified by the same reference numerals.

In FIG. 1 a fuel cell 2 has a cathode 4 and an anode 6. The cathode and the anode each comprise a catalyst comprising at least platinum in some form. The fuel cell 2 comprises an electrolyte 8. A fuel gas such as hydrogen and/or a gaseous alcohol is supplied in known manner to the anode 6 along inlet conduit 10. A gaseous oxidant such as oxygen or comprising at least oxygen is supplied in known manner to the cathode 4 along inlet conduit 12.

The fuel cell 2 is operated at a temperature which does not exceed substantially 250° C.

The electrolyte 8 can be any suitable know electrolyte, and the catalyst at the cathode 4 and at anode 6 can be platinum provided in any suitable known manner or form.

The electrolyte 8 may be a solid electrolyte, for example a known solid polymer electrolyte; the fuel cell 2 being operated at a temperature which does not exceed substantially 100° C., and preferably does not exceed substantially 80° C.

Alternatively, the electrolyte 8 may be a liquid electrolyte. In one example, the fueld cell 2 is an alkaline fuel cell with a liquid alkaline electrolyte; the fuel cell being operated at a temperature of substantially 65° C., and the catalyst may also include nickel as well as platinum provided in any suitable known manner or form. In another example, the liquid electrolyte 8 may be a known phosphoric acid electrolyte; the fuel cell 2 being operated at a temperature which does not exceed substantially 250° C., and preferably does not exceed substantially 200° C.

Electrical leads 14 and 16 are connected to the cathode 4 and anode 6 respectively. The leads 14 and 16 are connected to a first circuit comprising a switch S1 in series with a load 18 to be powered by the fuel cell. The leads 14, 16 are also connected to a second circuit comprising a switch S2 in series with an electrical cell or battery 20 having its positive terminal connected to the an ode 6 (when switch S2 is closed), and its negative terminal connected to the cathode 4. Switches S1 and S2 are controlled by a control 22 comprising timing means. The control 22 so operates that when it causes switch S1 to be closed, so that the fuel cell 2 is providing electric power to the load 18, the switch S2 is simultaneously interrupted; but when the control 22 causes switch S1 to be interrupted it also causes switch S2 to be simultaneously closed so that electric power to the load 18 is interrupted and a pulse of reverse D.C. potential due to the battery 20 is applied between anode 6 and the cathode 4, thereby putting the anode at a positive potential with respect to the cathode.

The control 22 operates the switches S1 and S2 so that switch S1 is closed and switch S2 is open for substantially the same time period T1, and switch S1 is open and switch S2 is closed for substantially the same time period T2. The cycle of switch operation is thus switch S1 is closed and switch S2 is open for time T1 followed immediately by time period T2 over which switch S1 is open and switch S2 is closed. The cycle is repeated continuously. Time period T1 is at least substantially ten times greater than the time period T2, and the period T2 does not exceed substantially 0.25 seconds. Thus when time period T2 is substantially 0.25 seconds, the period T1 can be at least substantially 2.5 seconds. It is believed to be preferable for the time period T2 (when the reverse D.C. potential is applied between the anode and the cathode) to be even shorter than substantially 0.25 seconds. For example when the time period T2 is substantially 0.1 seconds the time period T1 can be at least substantially 1.0 seconds, and when the time period T2 is substantially 0.05 seconds the time period T1 can be at least substantially 0.5 seconds.

It is understood that during the application of the reverse D.C. potential between the anode 6 and cathode 4 carbon monoxide, which may be poisoning the anode catalyst, is oxidisied whereby the anode catalyst is detoxified and the fuel cell 2 is rejuvenated.

The reverse D.C. potential can be substantially equal to or greater than 0.8 volts with respect to the open circuit potential of the fuel cell 2.

Referring now to FIGS. 2 and 3, the second circuit connected to leads 14 and 16 differs from that in FIG. 1, in that the second circuit in FIGS. 2 and 3 is a network comprising switches S3, S4, S5 and S6 and a capacitor 24. Switches S3 and S6 are in series with the capacitor 24 which is between them. Switch S4 is in parallel with switch S3 and the capacitor 24, whereas switch S5 is in parallel with the capacitor and the switch S6. Operation of the switches S1 and S3 to S6 is by the control 22. When the fuel cell 2 is to supply electrical power to the load 18, the switch S1 is closed as shown in FIG. 2, as are the switches S3 and S6 so that the cell also charges the capacitor 24; at the same time the switches S4 and S5 are open. To apply the reverse D.C. potential to the fuel cell 2 using the capacitor 24, the switches S4 and S5 are closed as shown in FIG. 3 (so that the positively charged plate of the capacitor is connected to the anode 6 via closed switch S5) and the switches S1, S3 and S6 are open. Thus in the cycle of operation the control 22 causes the switches S1, S3 and S6 to be closed for the aforesaid time T1 whereas simultaneously the switches S4 and S5 are open, and then the switches S4 and S5 are closed for the time period T2 whereas simultaneously the switches S1, S3 and S6 are open.

Because in FIG. 3, the switch S1 is open the supply of electric power to the load 18 by the fuel cell 2 is interrupted. To ensure that the load 18 is continuously powered a reversible or rechargeable cell or battery 26 (FIG. 2), for example a galvanic cell, or a capacitor 28 (FIG. 3) can be in parallel with the load. When switch S1 is open the cell 26 supplies electric power to the load 18, or discharge of the capacitor does the same. When the switch S1 is closed, the cell 26, for example a lead-acid cell, or the capacitor 28 is recharged by the fuel cell 2. The capacitor 24 is replaced in FIG. 4 by a rechargeable cell or battery 30 to provide the reverse D.C. potential as required.

Any or all of the switches S1 to S6 may be mechanical switches, for example relays, or may be electronic solid state switching arrangements, for example thyristors.

In FIG. 5, a plurality of said fuel cells 2 (individually assigned the reference 2A, 2B or 2C) are represented as being electrically connected together in series in a stack or battery 32 to which the electrical lead 14 is connected to the cathode 4 of the fuel cell 2A and the electric led 16 is connected to the anode 6 of the fuel cell 2C when there are n fuel cells in series forming a stack or battery (where n is any whole number) the reverse D.C. potential applied to the stack or battery may be substantially equal to or greater than n×0.8 volts with respect to the open circuit potential of the stack or battery.

We claim:

1. A method of operating a fuel cell of the type comprising an anode and a cathode each comprising catalyst means comprising platinum, the method comprising supplying gaseous fuel comprising hydrogen and/or a gaseous alcohol to said anode and supplying gaseous oxidant comprising oxygen to said cathode, operating the fuel cell at a temperature which does not exceed substantially 250° C., providing an interruptable first circuit externally of the cell for electric current derived from the cell to flow in the external circuit from the cathode to the anode by reason of the cathode being at a positive potential relative to the anode, providing a second circuit externally of the cell, said second circuit comprising electrical energy supply means for supplying selectively a reverse D.C. potential to said anode and cathode thereby putting the anode at a positive potential with respect to said cathode, interrupting and completing the first circuit alternately and operating the second circuit whereby when the first circuit is interrupted the reverse D.C. potential is applied simultaneously by means of the second circuit and when the first circuit is completed application of said reverse D.C. potential ceases, said first circuit being completed for a first time period and said reverse D.C. potential being applied for a second time period, said first time period being at least substantially ten times greater than said second time period, and the second time period being not greater than substantially 0.25 seconds.

2. A method according to claim 1, wherein said catalyst means is substantially entirely platinum.

3. A method according to claim 1, wherein said operating temperature of the fuel cell does not exceed substantially 100°.

4. A method according to claim 1, wherein said operating temperature of the fuel cell does not exceed substantially 80°.

5. A method according to claim 1, wherein said fuel cell comprises is solid polymer electrolyte.

6. A method according to claim 1, wherein said operating temperature does not exceed substantially 200°.

7. A method according to claim 1, wherein said fuel cell comprises a liquid electrolyte.

8. A method according to claim 7, wherein said fuel cell comprises is phosphoric acid electrolyte.

9. A method according to claim 1, wherein said fuel cell comprises a liquid alkaline electrolyte.

10. A method according to claim 1, wherein said electrical energy supply means comprises electrical cell means.

11. A method according to claim 1, wherein said electrical energy supply means comprises battery means.

12. A method according to claim 10, wherein said electrical energy supply means comprises rechargable electrical cell means.

13. A method according to claim 11, wherein said electrical energy supply means comprises rechargeable electrical battery means.

14. A method according to claim 1, wherein said electrical energy supply means comprises capacitor means.

15. A method according to claim 1, wherein said first circuit comprises an electrical load to be powered by said fuel cell, and second electrical energy supply means is provided to power said load when said first circuit is interrupted.

16. A method according to claim 15, wherein said second electrical energy supply means comprises electrical cell means.

17. A method according to claim 15, wherein said second electrical energy supply means comprises battery means.

18. A method according to claim 15, wherein said second electrical energy supply means comprises rechargeable electrical cell means.

19. A method according to claim 15, wherein said second electrical energy supply means comprises rechargeable battery means.

20. A method according to claim 15, wherein said second electrical energy supply means comprises capacitor means.

21. A method according to claim 1, wherein said first circuit means is interrupted and completed and said second circuit means is operated by operation of control means operating switch means in said first and second circuit means.

22. A method according to claim 21, wherein said switch means is provided by solid state switching means.

23. A method according to claim 1, in which said first time period is substantially 2.50 seconds and said second time period is substantially 0.25 seconds.

24. A method according to claim 1, wherein said first time period is substantially 1.0 seconds and said second time period is substantially 0.1 seconds.

25. A method according to claim 1, wherein said first time period is substantially 0.5 seconds and said second time period is substantially 0.05 seconds.

26. A method according to claim 1, wherein said method is applied to the operation of a stack or battery comprising a plurality of said fuel cells.

27. A method according to claim 1, wherein said reverse D.C. potential is at least substantially equal to 0.8 volts, with respect to the open circuit potential of said fuel cell.

28. A method according to claim 26, wherein said reverse D.C. potential applied to said stack or battery of said fuel cells in series is at least substantially equal to n×0.8 volts with respect to the open circuit potential of said stack or battery, and n is equal to the number of fuel cells in said stack or battery.

* * * * *